United States Patent
Robinson et al.

(10) Patent No.: US 7,349,972 B2
(45) Date of Patent: Mar. 25, 2008

(54) SECURE INITIALIZATION OF COMMUNICATION WITH A NETWORK RESOURCE

(75) Inventors: Mike C. Robinson, Roseville, CA (US); Andrew K. Khieu, Granite Bay, CA (US); Mark C. Lucas, Auburn, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 934 days.

(21) Appl. No.: 10/061,619

(22) Filed: Feb. 1, 2002

(65) Prior Publication Data

US 2003/0149778 A1    Aug. 7, 2003

(51) Int. Cl.
G06F 15/16    (2006.01)

(52) U.S. Cl. ............... 709/229; 709/202; 709/203; 709/217; 709/218; 709/219; 709/220; 709/221; 709/222; 709/225; 709/227; 709/228; 358/1.1

(58) Field of Classification Search ............... 709/225, 709/226, 227–229, 230, 232, 202–203, 217–219, 709/220–222; 358/1.1
See application file for complete search history.

(56) References Cited

U.S. PATENT DOCUMENTS

| | | | | |
|---|---|---|---|---|
| 5,465,160 A | * | 11/1995 | Kamo et al. | 358/401 |
| 5,524,135 A | * | 6/1996 | Mizikovsky et al. | 455/419 |
| 5,699,495 A | * | 12/1997 | Snipp | 358/1.15 |
| 5,886,793 A | * | 3/1999 | Satou | 358/404 |
| 5,970,218 A | * | 10/1999 | Mullin et al. | 358/1.15 |
| 6,041,704 A | * | 3/2000 | Pauschinger | 101/91 |
| 6,438,594 B1 | * | 8/2002 | Bowman-Amuah | 709/225 |
| 6,636,486 B1 | * | 10/2003 | Magloughlin | 370/252 |
| 6,721,791 B1 | * | 4/2004 | Qiao | 709/224 |
| 6,795,862 B1 | * | 9/2004 | Keohane et al. | 709/230 |
| 6,806,976 B1 | * | 10/2004 | Suyehira | 358/1.14 |
| 6,816,270 B1 | * | 11/2004 | Cooper et al. | 358/1.13 |
| 6,871,285 B1 | * | 3/2005 | Carney et al. | 726/7 |
| 6,943,907 B1 | * | 9/2005 | Kim | 358/1.14 |
| 7,082,574 B2 | * | 7/2006 | Ogino et al. | 715/764 |
| 2001/0012122 A1 | * | 8/2001 | Ueda | 358/1.15 |
| 2002/0032703 A1 | * | 3/2002 | Gassho et al. | 707/527 |
| 2002/0145748 A1 | * | 10/2002 | Nonoyama et al. | 358/1.14 |
| 2003/0037033 A1 | * | 2/2003 | Nyman et al. | 707/1 |
| 2003/0058277 A1 | * | 3/2003 | Bowman-Amuah | 345/765 |
| 2003/0083996 A1 | * | 5/2003 | Fischer | 705/52 |
| 2003/0112452 A1 | * | 6/2003 | McIntyre | 358/1.1 |
| 2004/0019786 A1 | * | 1/2004 | Zorn et al. | 713/168 |
| 2004/0185877 A1 | * | 9/2004 | Asthana et al. | 455/456.6 |

FOREIGN PATENT DOCUMENTS

JP    11165446 A    *    6/1999

\* cited by examiner

*Primary Examiner*—David Wiley
*Assistant Examiner*—Alina Boutah

(57) ABSTRACT

A method for initialization of secure communication between a network resource and a client via a network. The method includes receiving an access at the network resource from a management application of a client. In response to the access, configuration parameters are generated for initializing secure communication with the client via the network. Security configuration information is printed showing the configuration parameters. The security configuration information is for enabling manual input of the configuration parameters into the management application. Secure communication is implemented with the management application in accordance with the configuration parameters.

40 Claims, 6 Drawing Sheets

SECURE INITIALIZATION OF COMMUNICATION WITH A NETWORK RESOURCE

TECHNICAL FIELD

The present invention relates generally to data processing on digital computer systems and computer system networks. More specifically, the present invention pertains to a method and system for secure communication between network computer system devices.

BACKGROUND ART

The use of network based electronic communications and information processing systems for information control and information retrieval has rapidly proliferated in modern business environments. Within a typical enterprise, hundreds of client computer systems and server computer systems are constantly accessed by hundreds, or even thousands, of users for obtaining company information, news, competitive information, training materials, and the like, via one or more company wide LANs (local area networks) or WANs (wide area networks).

As used generally, the term network refers to a system that transmits any combination of voice, video and/or data between users. The network includes the embodying system of connected clients and servers and their associated software (e.g., network operating system in the client and server machines, the cables connecting them and the supporting hardware, such as bridges, routers, switches, etc.).

LANs and WANs are generally differentiated by the geographical area of the users being served. Both are made up of servers, clients, NOS (network operating system) services and supporting hardware. Servers are typically high-speed computer systems that hold programs and data or perform services that are shared by network users (e.g., the clients). The clients (e.g., desktop computer systems, workstations, and the like) are typically used to perform individualized, stand-alone processing and access the network servers as required. The actual communications path hardware is the cable (twisted pair, coax, optical fiber) that interconnects each network adapter. In wireless systems such as WLANs (wireless LANs) and the like, antennas, access point devices, and towers are also part of the network hardware. The overall scheme of multiple individual clients connected to shared servers comprises the well known client server network architecture.

Communication and message transfer within client server networks is generally managed by a transport protocol such as, for example, TCP/IP, IPX, or the like. The physical transmission of data is typically performed by the access method (Ethernet, Token Ring, etc.) which is implemented in the network adapters that are plugged into the computer systems. The standardized communications protocols enable the widespread interoperability of communications networks and the widespread exchange of business related information.

The widespread use of interconnected and interrelated communications networks provides a significant security challenge. Virtually all modern companies and corporations are now implementing information exchange networks for their employees, suppliers and customers and the like. Private networks (LANs, WANs, WLANs, etc.) along with the Internet allow this information to exchange more quickly and widely than ever.

Unfortunately, this widespread exchange of information has put the security of such information, and the security of the network infrastructure itself, at risk. Attacks against networks are becoming increasingly common, and pose conflicts for network managers with respect to providing access to network resources for those individuals requiring it, and preventing and denying access to those who are not authorized.

Providing secure communication between and among various network resources is generally implemented through the use of certain standardized communication protocols. These protocols are designed to provide a degree of security for transmission of information while also ensuring interoperability among the hardware components of different networks. However, experience has shown that these prior art communication protocols have a number of security deficiencies. For example, prior art methods of assigning security information (e.g., SNMP, TFTP, TELNET, Embedded Web, and the like) transmit sensitive information in plain text across the network. Such sensitive information is often used to initialize certain security protocols for follow-on communication (e.g., passwords, security keys, etc.). However, a simple trace at startup, configuration, or any general communication across the network exposes these passwords. Using such a trace, an unauthorized user (e.g., hacker, etc.) can obtain the passwords and compromise any subsequent communication, or obtain access to critical network resources.

One prior art solution involves limiting access to network resources only to those users on a predefined access control list. For example, the access control list can be used to provide set access control to network resources based on the IP address of the client, thereby protecting against unauthorized access. However, the access control list does not prevent spoofing, where a unauthorized client (e.g., hacker, etc.) assumes the IP address of an authorized client.

Other prior art solutions involve using sophisticated encryption routines that encrypt all packets between the transmitting and receiving nodes. One such protocol is SNMP (Simple Network Management Protocol). SNMP is a widely used network monitoring and control protocol, wherein data is passed from SNMP agents, which are hardware and/or software processes reporting activity in each network device (hub, router, bridge, etc.) to the workstation console used to oversee the network. The agents return information contained in a MIB (Management Information Base), which is a data structure that defines what is obtainable from the device and what can be controlled (turned off, on, etc.). SNMP has become widely used in network infrastructure components. SNMPv3 (SNMP version 3) is a recently adopted version of the specification that defines a secure version of the SNMP protocol.

The security of prior art SNMPv3 schemes solves some problems but unfortunately creates others. SNMPv3 provides for encryption of all data packets during transmission across the network However, SNMPv3 is problematic in that it does not easily accommodate new users or mobile users with respect to access to protected network resources. For example, in many circumstances, it is desirable for a non-predetermined user, such as, for example, a visiting outside contractor or employee from a different company campus, to obtain access to network resources. Examples include obtaining access to print servers on the network to print information, reports, etc. Some portions of a company network maybe specifically configured to provide access to such mobile users through wireless access points and the like. However, these provisions may be defeated by the SNMPv3 protocols which are not designed for easy accommodation to allow access to new authorized users (e.g., no access to printers, no access to digital projectors, no access to networked storage, etc.). Faced with these difficulties, many companies simply ignore the threat of unauthorized use and simply stick to the more easily supported easily accommodating insecure version of SNMP.

Thus what is required is a solution that protects sensitive network resources, such as print servers and the like, while retaining the ability of accommodating new users. What is required is a solution that protects against common network attacks such as spoofing, packet sniffing, and the like. What is required is a solution that accommodates the ease of use aspects of wireless networks while still providing protection for sensitive network resources.

DISCLOSURE OF THE INVENTION

A method for initialization of secure communication between a network resource and a client via a network. The method includes receiving an access at the network resource from a management application of a client. In response to the access, configuration parameters are generated for initializing secure communication with the client via the network. Security configuration information is printed showing the configuration parameters. The security configuration information is for enabling manual input of the configuration parameters into the management application. Secure communication is implemented with the management application in accordance with the configuration parameters.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Embodiments of the present invention provide a solution that protects sensitive network resources, such as print servers and the like, while retaining the ability to accommodate new users. Embodiments of the present invention provide a solution that protects against common network attacks such as spoofing, packet sniffing, and the like. Embodiments of the present invention provide a solution that accommodates the ease of use aspects of wireless networks while still providing protection for sensitive network resources. Embodiments of the present invention and their benefits are further described below.

Figure 1:
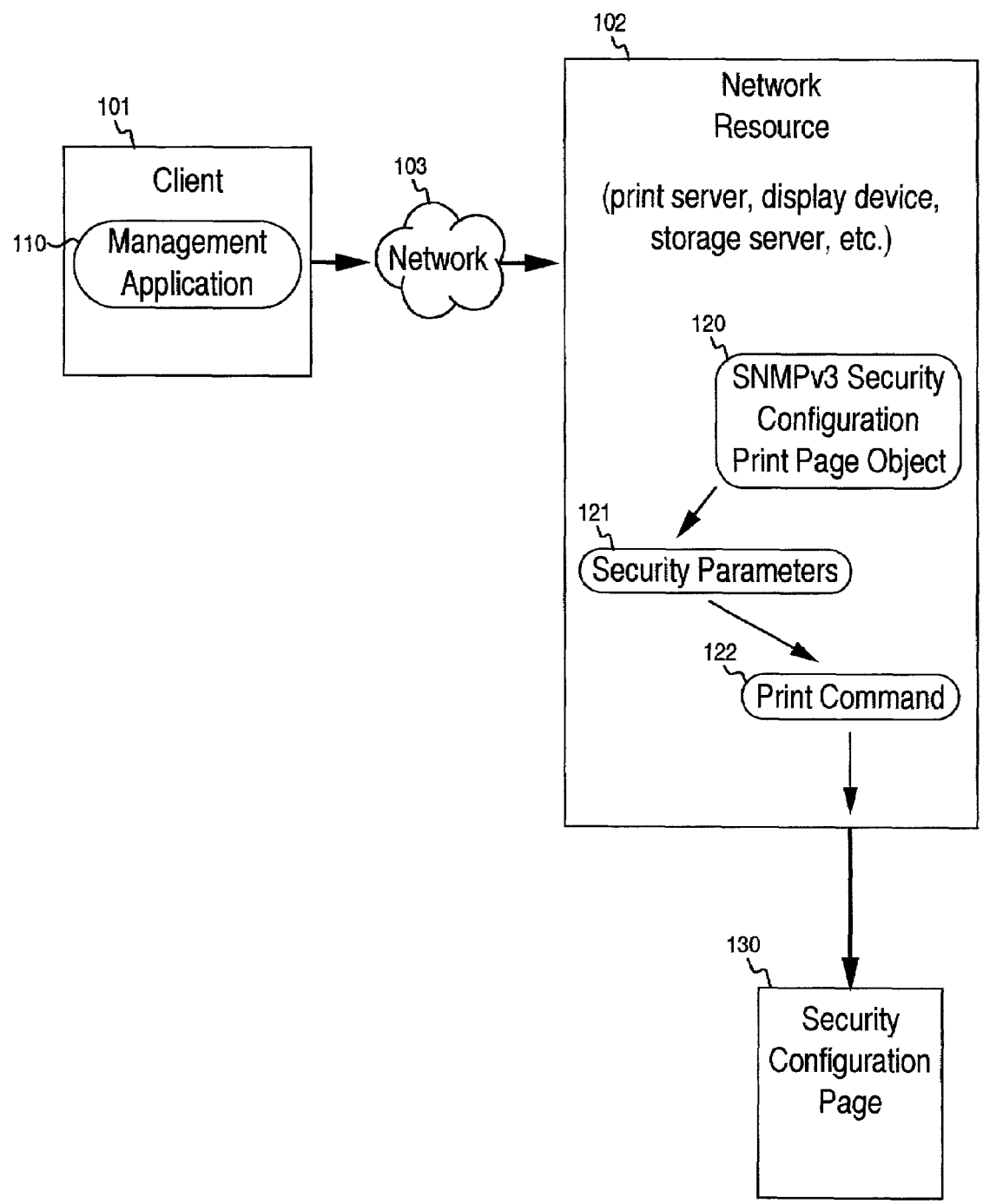
FIG. 1 shows a diagram of a client/server secure communication system in accordance with one embodiment of the present invention.

FIG. 1 shows a diagram of a system 100 in accordance with one embodiment of the present invention. As depicted in FIG. 1, system 100 includes a client 101 coupled to a network resources 102 via a network 103.

In the system 100 embodiment, client 101 comprises a computer system configured for use by, for example, an individual user (e.g., a desktop computer system, workstation, laptop computer system, or the like). The client 101 typically include software for accomplishing individual tasks as required by a user. Such software includes for example, word processing, CAD (computer-aided design), data entry, and the like. In addition, client 101 also includes software for implementing a management application 110. In the present embodiment, management application 110 is configured to manage network communication with network resources, for example network resources 102, and other clients coupled to network 103. Management application 110 is also configured to manage security protocols and procedures required for implementing secure communication across network 103.

Referring still to the system 100 embodiment of FIG. 1, the network 103 comprises a communications network as implemented, for example, within company or corporation. In a typical implementation, network 103 would be configured to connect, for example, up to 100 or more client computer systems, server computer systems, and the like for obtaining company information, news, competitive information, training materials, etc. Depending upon the geographic area of these being served, network 103 can be a LAN or WAN, or virtual LAN, or the like.

Communication and message transfer within network 103 is generally in accordance with standardized transport protocols such as, for example, TCP/IP, IPX, AppleTalk, or the like.

In the present embodiment, network resource 102 comprises a computer system providing a shared resource for the plurality of clients, client 101 being one such client, coupled to network 103. As depicted in FIG. 1, network resource 102 can be, for example, a print server providing shared access to a built-in printer, or an externally coupled printer. Alternatively, network resource 102 can be a network device providing some other function but having included therein a printer device. Examples include a display device (e.g., overhead LCD display, conference room plasma display, etc.), a storage server, or the like.

In accordance with one embodiment of the present invention, system 100 provides a method for initialization of secure communication between a network resource (e.g., network resource 102) and a client (e.g., client 101) via a network (e.g., network 103). For example, in one embodiment, the initialization method includes receiving an access at the network resource 102 from the management application 110 of client 101. In response to the access, an SNMPv3 print page object 120 is set and security configuration parameters 121 are generated for initializing secure communication with the client 101 via the network 103.

In the present embodiment, the SNMPv3 print page object 120, in conjunction with the security configuration parameters 121, cause a print command 122 to issue. The print command 122, in turn, causes the printout of a security configuration page 130. The security configuration page 130 shows the security configuration parameters required for input into management application 110, for example, by an individual user, in order to initialize secure communication between client 101 and network resource 102. The security configuration page 130 can be configured to facilitate the manual input of the configuration parameters into the management application. For example, in addition to listing the one or more security configuration parameters required for initialization, the configuration parameters can be listed along with instructions or Figures detailing the manner of their entry into management application 110.

Once the management application 110 is configured in accordance with the security configuration page 130, a secure SNMPv3 communication session can begin between the client 101 and the network resource 102. The SNMPv3 communication will occur while using the additional security provisions provided by the standard (e.g., packet authentication, packet encryption, etc.), thereby providing a high degree a protection against network attacks such as spoofing, packet sniffing, and the like.

It should be noted that the printer hardware for printing security configuration page 130 can be built into the network resource 102 or coupled to the network resource 102. Example embodiments include, as described above, an implementation where network resource 102 is a print server having an externally coupled printer, or where network resource 102 is a printer having a built-in print server. Additionally, other means may be utilized for displaying the security configuration page 130. Example embodiments include an implementation where network resource 102 is a display device and the security configuration page 130 is depicted on a portion of the display, or where network resource 102 is a storage server and security configuration page 130 is depicted on a small display mounted on the storage server. In each of these embodiments, the depiction of the security configuration parameters on security configuration page 130 allows a user to securely enter the security configuration information into the management application 110 of client 101.

It should be noted that the configuration information provided by the security configuration page 130 is provided to the user without exposure across a network 103 in an unsecured mode. This allows the user to access network resource 102 in a more convenient unsecured mode (e.g., SNMPv1) in order to obtain the security configuration page 130, and then subsequently initiate secure communication after configuring the management application 110. In this manner, embodiments of the present invention provide a solution that protects sensitive network resources, such as print servers and the like, while retaining the ability to accommodate new users. New users are still able to access unsecured areas or insensitive areas of network 103 while remaining in an unsecured mode. Once the user requires access to a high value network resource (e.g., network resource 102) the user to requests a security configuration page 130 and configure his/her client 101 accordingly (e.g., via the management application 110). Once secure communication is initialized, the embodiments of the present invention protect against common network attacks such as spoofing, packet sniffing, and the like. In this manner, embodiments of the present invention provide access to those individuals requiring it, while simultaneously preventing and denying access to those who are not authorized.

Figure 2:
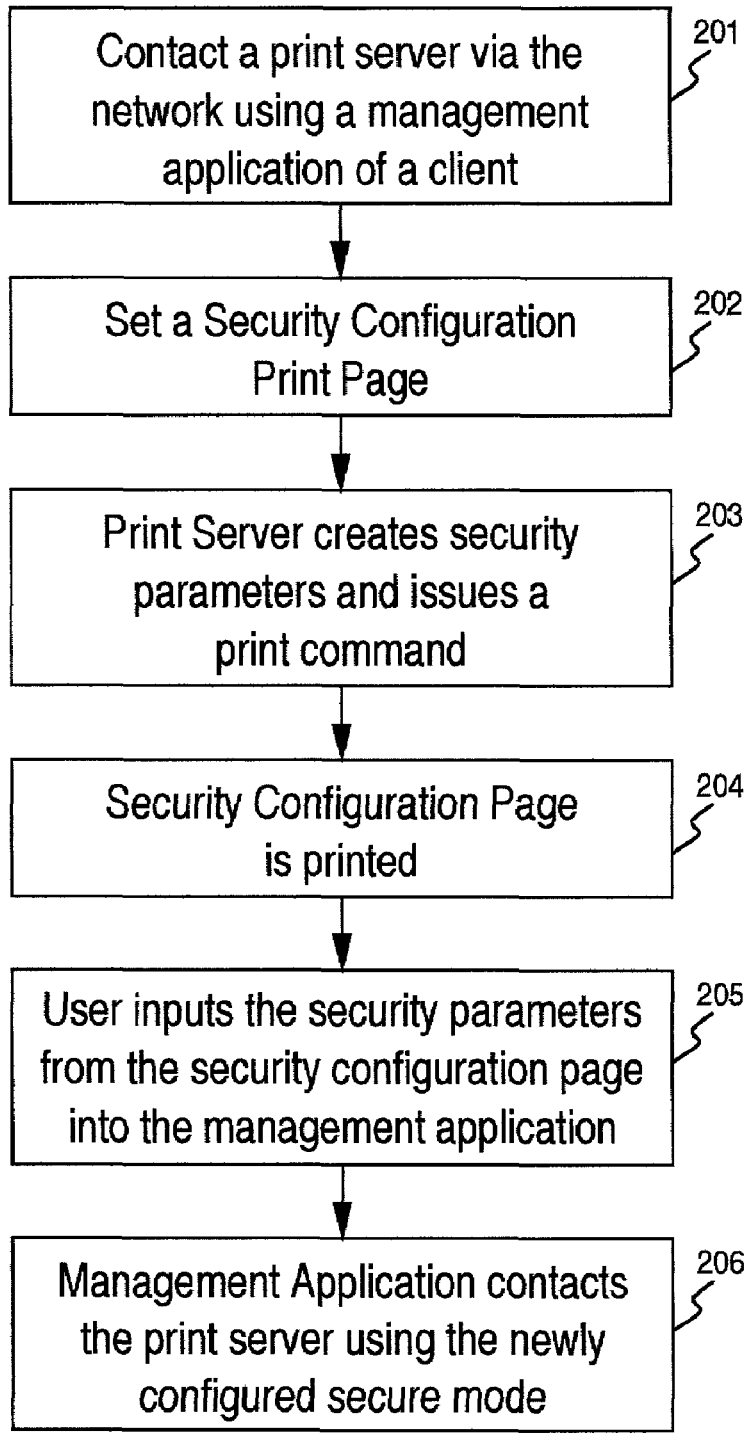
FIG. 2 shows a flowchart of the steps of a secure communication initialization process in accordance with one embodiment of the present invention.

Referring now to FIG. 2, a flow chart showing the steps of a process 200 in accordance with one embodiment of the present invention is shown. As depicted in FIG. 2, process 200 shows the operating steps as performed by a user and a print server of a system (e.g., system 100) in order to establish a secure communication session. In this embodiment, the network resource 102 is a print server. Process 200 is described with reference to system 100 in FIG. 1.

Process 200 begins in step 201, where a management application 110 of a client 101 contacts a print server (e.g., network resource 102). In step 202, in response to the contact from the management application 110, the print server 102 sets an SNMPv3 security configuration print page object 120. In step 203, the print server 102 creates security configuration parameters 121 and issues a print command 122. In the present embodiment, the print server 102 randomly creates security configuration parameters 121. In step 204, in response to the print command 122, a security configuration page 130 is printed. In step 205, the user retrieves the security configuration page 130 and inputs the security configuration parameters from security configuration page 130 into the management application 110. Subsequently, in step 206, the management application 110 contact the print server 102 using the newly configured secure mode.

Figure 3:
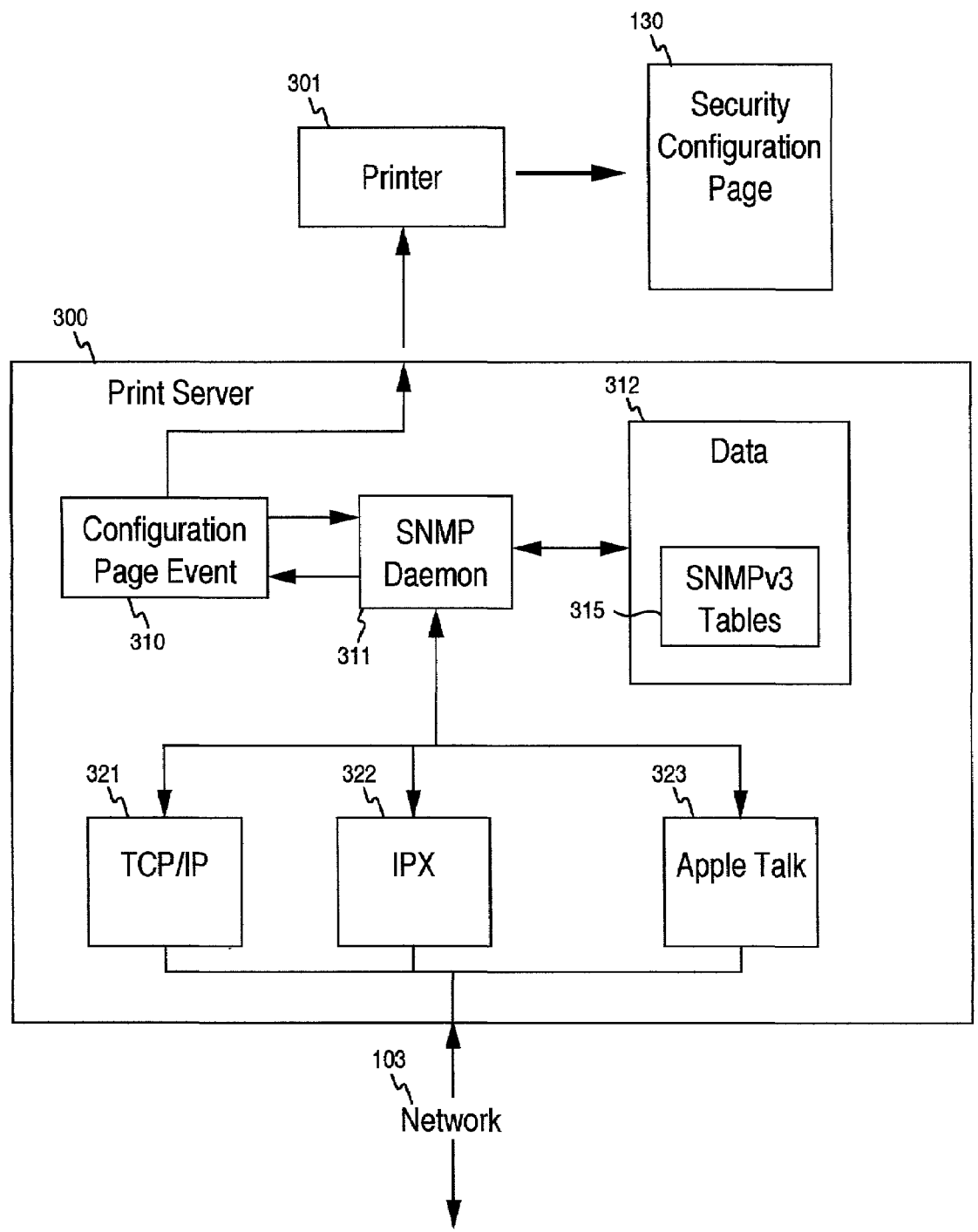
FIG. 3 shows a diagram of internal components of a print server in accordance with one embodiment of the present invention.

FIG. 3 shows a diagram of internal components of a print server 300 in accordance with one embodiment of the present invention. As depicted in FIG. 3, print server 300 includes an SNMP Daemon 311 coupled to access a data structure 312. The data structure 312 includes SNMPv3 tables for managing security accounts of authorized users. The SNMP Daemon 311 is coupled to interface components 321-323 for interfacing with various communications protocols (e.g., TCP/IP, IPX, Apple Talk, etc.) which may be prevalent on network 103. The configuration page event 310 interacts with SNMP Daemon 311 to initiate and implement security configuration print page objects and return associated information to the SNMP Daemon 311.

Referring still to FIG. 3, in this embodiment, the print server 300 is coupled to an external printer 301. The configuration page event 310, through interaction with the SNMP Daemon 311, causes a print page object and an associated print command to be issued to the printer 301 and thus print out security configuration page 130. The user then retrieves the security configuration page 130 in the manner described above.

It should be noted that the components of the print server 300 depicted in FIG. 3 can be based in hardware or in software, or in some combination thereof.

Figure 4:
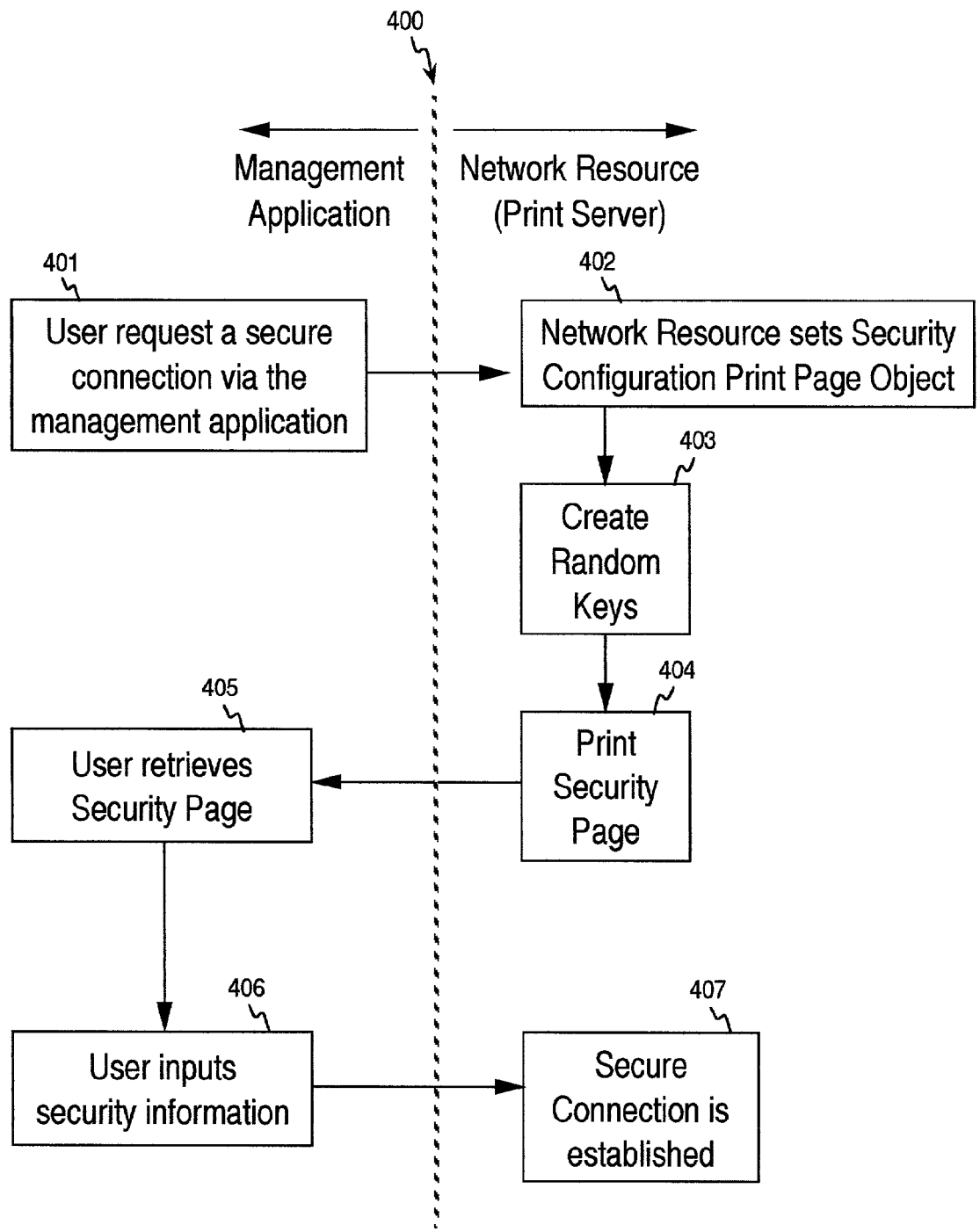
FIG. 4 shows a diagram depicting the steps performed in a secure communication initialization process in accordance with one embodiment of the present invention, with respect to where the steps are performed.

FIG. 4 shows a diagram depicting the steps performed during a secure communication initialization process in accordance with one embodiment of the present invention, with respect to where the steps are performed (e.g., at the network resource or at the management application). In this embodiment, steps shown on the left-hand side of line 400 occur at the management application (e.g., client) while steps to show on the right hand side of line 400 occur at the network resource (e.g., print server, etc.).

As shown in FIG. 4, step 401, the user requesting a secure connection via the management application, occurs at the management application side, at the client. Step 402, the network resource setting a security configuration print page object, occurs at the network resource. Similarly, step 403, creating random keys (e.g., the security configuration parameters 121), and step 404, printing the security configuration page, both occur at the network resource side. Step 405, the user retrieving security page, and step 406, the user inputting security information into the management application, occur at the management application side. Subsequently, in this embodiment, step 407, secure connection being established, is performed at the network resource side (e.g., a security account being created and maintained for the user).

Figure 5:
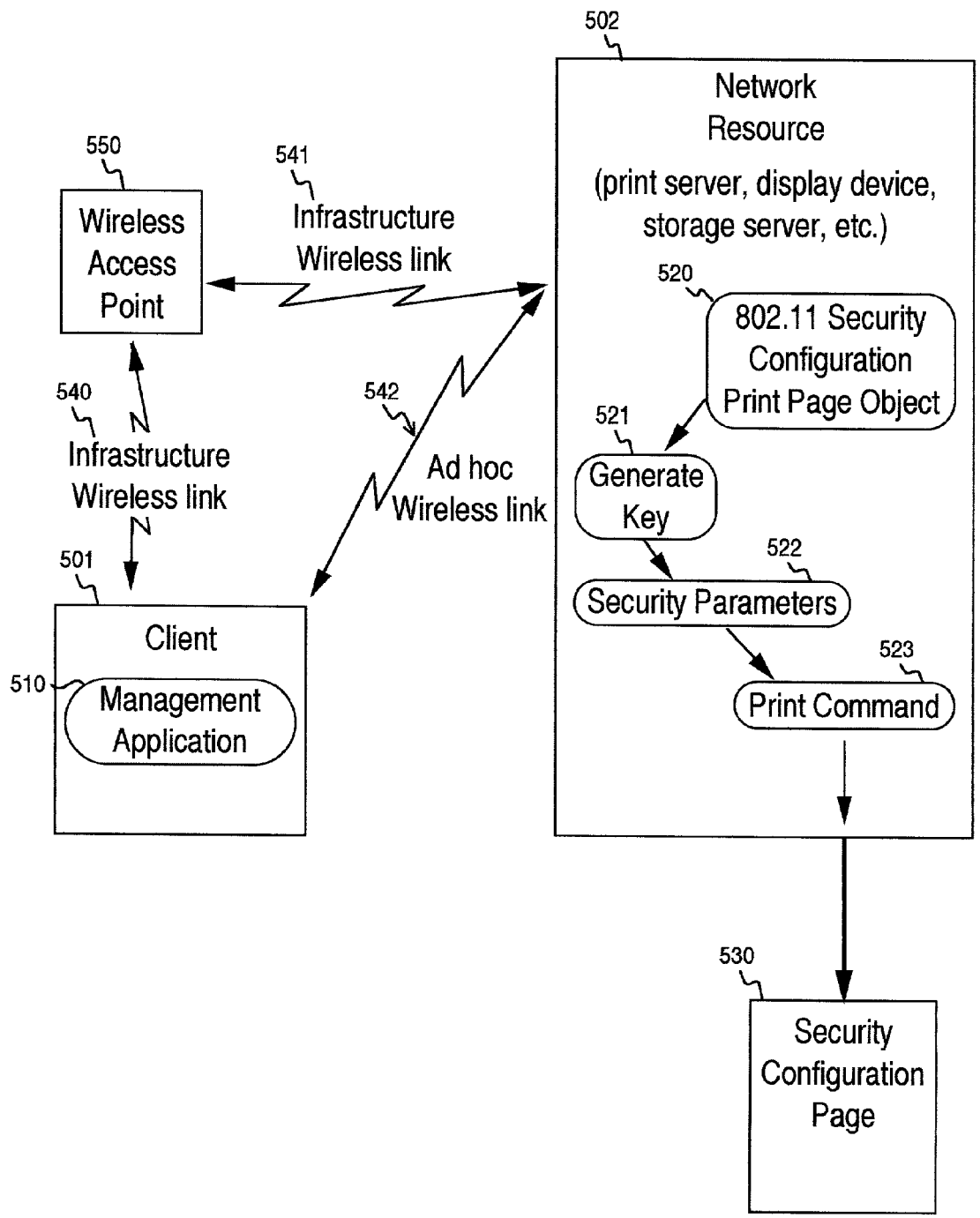
FIG. 5 shows a diagram of a wireless access point system in accordance with one embodiment of the present invention.

FIG. 5 shows a diagram of a wireless access point system 500 in accordance with one embodiment of the present invention. As depicted in FIG. 5, system 500 is similar to system 100 of FIG. 1, wherein a secure communication initialization method is implemented between a client and a network resource through the use of a security configuration page. However, system 500 shows a case where a client 501, using a management application 510, configures a secure communication session with a network resource 502 via a wireless access point 550. The wireless access point 550 functions by providing wireless links to a plurality of clients. These clients are typically mobile clients, newly arriving clients, or otherwise clients that are not easily hardwired into network 103. Examples include outside contractors, visitors, and the like. Client 501 is one such client. Additionally, system 500 shows a case where the network resource 502 includes wireless communication functionality that allows direct communication with both the client 501 and the wireless access point 550.

The network resource 502 initiates secure communication in a manner similar to network resource 102 of FIG. 2. However, network resource 502 is configured to utilize 802.11 security standards and protocols. In the present embodiment, an access request from management application 510 is received by the network resource 502 for secure communication, via ad hoc access 542. In response to the access, an 802.11 security configuration print page object 520 is set, an 802.11 WEP (wired equivalent privacy) key 521 is generated, and security configuration parameters 522 are generated for initializing secure wireless communication with the client 501 via the network 103 and wireless access point 550, in infrastructure mode via links 540 and 541. The security parameters 522 in conjunction with the print page object 520 cause a print command 523 to issue. The print command 523 in turn causes a security configuration page 530 to print. The security configuration page 530 has printed thereon security configuration parameters, including the WEP key. This information is entered by the user into management application 510 to initiate secure wireless communication. System 500 of FIG. 5 is further described in the discussion of FIG. 6 below.

Figure 6:
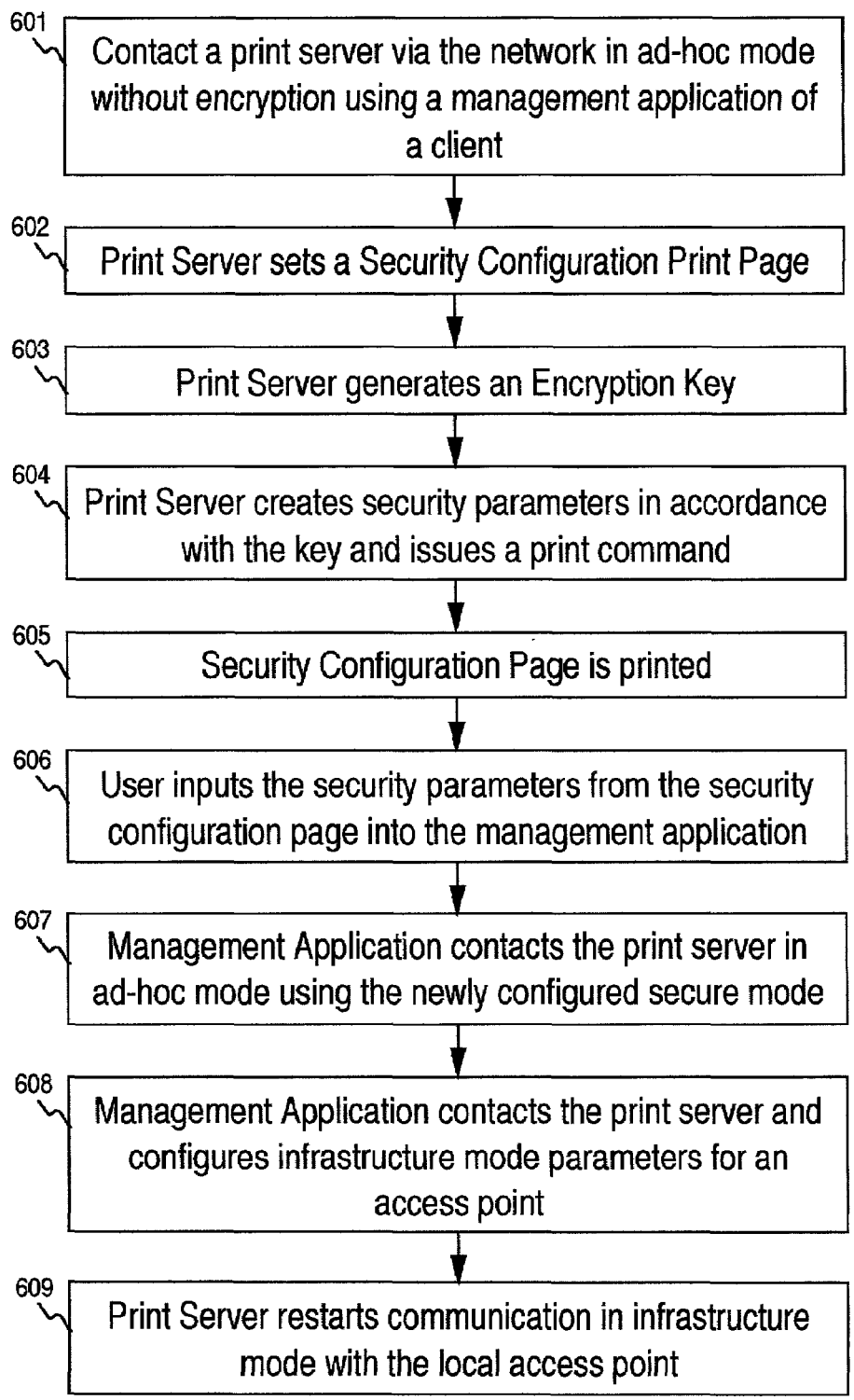
FIG. 6 shows a flowchart of the steps of a secure communication initialization process in accordance with one wireless access point embodiment of the present invention.

Referring now to FIG. 6, a flow chart showing the steps of a process 600 in accordance with one embodiment of the present invention is shown. As depicted in FIG. 6, process 600 shows the operating steps as performed by a user and a print server of a system (e.g., system 500) in order to establish a secure wireless communication session via a wireless access point. Process 600 is described with reference to system 500 in FIG. 5. In this embodiment, the network resource 502 is a print server.

Process 600 begins in step 601, where a management application 510 of a client 501 contacts a print server (e.g., network resource 502 ). In the present embodiment, this initial contact is in ad hoc mode without encryption, e.g., link 542. In step 602, in response to the contact from the management application 510, the print server 502 sets an 802.11 security configuration print page object 520. In step 603, the print server 502 generates an encryption key 521. In the present embodiment, the encryption key 521 is a randomly generated 802.11 WEP key. The encryption key 521 is used to encrypt transmission in 802.11 ad hoc mode.

In step 604, the print server 502 generates security parameters 522 in accordance with the encryption key 521 and issues a print command 523. In step 605, the print command 523 causes a security configuration page 530 to be printed. In step 606, the user retrieves the security configuration page 530 and inputs the security parameters and the encryption key printed thereon into the management application 510. In step 607, the management application 510 contacts the print server 502 using link 542 in a secure mode in accordance with the security parameters and the encryption key. In step 608, the management application 510 contacts the print server 502 and configures secure infrastructure mode communication in accordance with the security parameters and the encryption key. Subsequently, in step 609, the print server 502 restarts secure communication in infrastructure mode with the local access point 550, via links 540 and 541.

In this manner, the process 600 embodiment of the present invention protects against common network attacks such as spoofing, packet sniffing, and the like. These network attacks can be especially problematic for networks incorporating wireless links and wireless access points. The process 600 embodiment of the present invention provides a solution that accommodates the ease of use aspects of wireless networks while still providing protection for sensitive network resources.

Thus embodiments of the present invention provide a solution that protects sensitive network resources, such as print servers and the like, while retaining the ability to accommodate new users. Embodiments of the present invention provide a solution that protects against common network attacks such as spoofing, packet sniffing, and the like. Embodiments of the present invention provide a solution that accommodates the ease of use aspects of wireless networks while still providing protection for sensitive network resources.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the Claims appended hereto and their equivalents.

What is claimed is:

1. A method for initialization of secure communication between a network resource and a client via a network, comprising:

receiving access in an unsecured mode to the network resource from a management application of the client via the network;

in the unsecured mode, generating configuration parameters for initializing secure communication between the network resource and the client via the network;

printing a security configuration page showing the configuration parameters for initializing secure communication between the network resource and the client;

receiving manual input of the configuration parameters into the management application of the client; and after receiving manual input of the configuration parameters, implementing secure communication between the network resource and the management application of the client in accordance with the configuration parameters.

2. The method of claim 1 wherein the network resource is a print server and the security configuration page is printed using a printer coupled to the print server.

3. The method of claim 1 wherein the secure communication is in accordance with a version of SNMPv3 standards.

4. The method of claim 1 further comprising:
generating random security parameters to generate the configuration parameters for initializing the secure comnmunication.

5. The method of claim 1 further comprising:
setting a security configuration print page object in response to contact from the management application.

6. The method of claim 5 wherein the security configuration print page object is in accordance with a version of SNMPv3 standards.

7. A system for initialization of secure communication between a network resource and a client via a network, comprising:

means for receiving access in an unsecured mode to the network resource from a management application of the client via the network;

means for generating configuration parameters for initializing secure communication between the network resource and the client via the network, while in the unsecured mode;

means for printing a security configuration page showing the configuration parameters for initializing secure communication between the network resource and the client;

means for receiving manual input of the configuration parameters into the management application of the client; and means for implementing secure communication between the network resource and the management application of the client in accordance with the configuration parameters after receiving manual input of the configuration parameters.

8. The system of claim 7 wherein the network resource is a print server and the security configuration page is printed using a printer coupled to the print server.

9. The system of claim 7 wherein the means for implementing secure communication are in accordance with a version of SNMPv3 standards.

10. The system of claim 7 further comprising:
means for generating random security parameters to generate the configuration parameters for initializing the secure communication.

11. The system of claim 7 further comprising:
means for setting a security configuration print page object in response to contact from the management application.

12. The system of claim 7 wherein the means for setting a security configuration print page object are in accordance with a version of SNMPv3 standards.

13. A network resource system for initializing secure communication with a client via a network, comprising:
a network interface configured to receive access in an unsecured mode via the network from a management application of the client; and
an SNMP daemon configured to generate configuration parameters for initializing secure communication with the client via the network, while in the unsecured mode;
wherein the SNMP daemon is configured to generate a configuration page event causing a printer coupled to the network resource to print a security configuration page showing the configuration parameters, and
wherein upon manual input of the configuration parameters from the security configuration page into the management application of the client, secure communication with the client is implemented.

14. The system of claim 13 further comprising:
an SNMP user table within a data structure of the network resource, the SNMP user table for access by the SNMP daemon and configured to store a user account created in accordance with the configuration parameters.

15. The system of claim 13 wherein the network resource is a print server.

16. The system of claim 13 wherein the SNMP daemon is configured to implement secure communication in accordance with a version of SNMPv3 standards.

17. The system of claim 13 wherein the SNMP daemon is configured to generate random security parameters in order to generate the configuration parameters for initializing the secure communication.

18. The system of claim 13 wherein the network interface includes a plurality of interface components for interfacing with a corresponding plurality of network communication protocols.

19. The system of claim 18 wherein the network communication protocols include TCP/IP, IPX, and Apple Talk.

20. A method for initialization of secure communication between a network resource and a client via a network wireless access point, comprising:
receiving ad hoc access in an unsecured mode to the network resource from a management application of the client;
in the unsecured mode, generating a security key for initializing secure communication between the network resource and the client via a wireless access point;
printing a security configuration page showing the security key;
receiving manual input of the security key into the management application of the client;
receiving encrypted ad hoc access to the network resource from the management application in accordance with the security key for configuration of infrastructure mode parameters for the wireless access point; and
upon manual input of the security key from the security configuration page, implementing secure communication between the network resource and the management application of the client in accordance with the security key via the wireless access point in an infrastructure mode.

21. The method of claim 20 wherein the network resource is a print server and the security configuration page is printed using a printer coupled to the print server.

22. The meted of claim 20 wherein the secure communication is in accordance with a version of 802.11 standards.

23. The method of claim 20 wherein the security key is a randomly generated 802.11 Wired Equivalent Privacy key for initializing the secure communication.

24. The method of claim 20 further comprising:
setting a 802.11 security configuration print page object in response to contact from the management application.

25. A system for initialization of secure communication between a network resource and a client via a network wireless access point, comprising:
means for receiving ad hoc access in an unsecured mode to the network resource from a management application of the client;
means for generating a security key for initializing secure communication between the network resource and the client via a wireless access point while in the unsecured mode;
means for printing a security configuration page showing the security key;
means for receiving manual input of the security key into the management application of the client;
means for receiving an encrypted ad hoc access to the network resource from the management application in accordance with the security key for configuration of infrastructure mode parameters for the wireless access point; and
means for implementing secure communication between the network resource and the management application of the client in accordance with the security key via the wireless access point in an infrastructure mode after receiving manual input of the security key.

26. The system of claim 25 wherein the network resource is a print server and the means for printing a security configuration page comprises a printer coupled to the print server.

27. The system of claim 25 wherein the means for implementing secure communication is in accordance with a version of 802.11 standards.

28. The system of claim 25 wherein the security key is a randomly generated 802.11 Wired Equivalent Privacy key for initializing the secure communication.

29. The system of claim 25 further comprising:
setting a 802.11 security configuration print page object in response to contact from the management application.

30. The computer readable storage media having computer readable code which when executed by a computer system of a network resource causes the network resource to implement a method for initialization of secure communication between the network resource and a client via a network, comprising:
receiving access in an unsecured mode to the network resource from a management application of the client via the network;
in the unsecured mode, generating configuration parameters for initializing secure communication between the network resource and the client via the network;
printing a security configuration page showing the configuration parameters for initializing secure communication between the network resource and the client;
receiving manual input of the configuration parameters into the management application of the client; and
after receiving manual input of the configuration parameters, implementing secure communication between the network resource and the management application of the client in accordance with the configuration parameters.

31. The computer readable media of claim 30 wherein the network resource is a print server and the security configuration page is printed using a printer coupled to the print server.

32. The computer readable media of claim 30 wherein the secure communication is in accordance with a version of SNMPv3 standards.

33. The computer readable media of claim 30 further comprising:
generating random security parameters to generate the configuration parameters for initializing the secure communication.

34. The computer readable media of claim 30 further comprising:
setting a security configuration print page object in response to contact from the management application.

35. The computer readable media of claim 34 wherein the security configuration print page object is in accordance with a version of SNMPv3 standards.

36. The computer readable storage media having computer readable code which when executed by a computer system of a network resource causes the network resource to implement a method for initialization of secure communication between the network resource and a client via a network wireless access point, comprising:
receiving ad hoc access in an unsecured mode to the network resource from a management application of the client;
in the unsecured mode, generating a security key for initializing secure communication between the network resource and the client via a wireless access point;
printing a security configuration page showing the security key;
receiving manual input of the security key into the management application of the client;
receiving encrypted ad hoc access to the network resource from the management application in accordance with the security key for configuration of infrastructure mode parameters for the wireless access point; and
upon manual input of the security key from the security configuration page, implementing secure communication between the network resource and the management application of the client in accordance with the security key via the wireless access point in an infrastructure mode.

37. The computer readable storage media of claim 36 wherein the network resource is a print server and the security configuration page is printed using a printer coupled to the print server.

38. The computer readable storage media of claim 36 wherein the secure communication is in accordance with a version of 802.11 standards.

39. The computer readable storage media of claim 36 wherein the security key is a randomly generated 802.11 Wired Equivalent Privacy key for initializing the secure communication.

40. The computer readable storage media of claim 36 further comprising:
setting a 802.11 security configuration print page object in response to contact from the management application.

* * * * *

UNITED STATES PATENT AND TRADEMARK OFFICE
CERTIFICATE OF CORRECTION

PATENT NO.         : 7,349,972 B2                                   Page 1 of 1
APPLICATION NO. : 10/061619
DATED              : March 25, 2008
INVENTOR(S)        : Mike C. Robinson et al.

It is certified that error appears in the above-identified patent and that said Letters Patent is hereby corrected as shown below:

In column 9, line 25, in Claim 4, delete "comnmunication" and insert -- communication --, therefor.

In column 10, line 1, in Claim 12, delete "claim 7" and insert -- claim 11 --, therefor.

In column 10, line 66, in Claim 22, delete "meted" and insert -- method --, therefor.

In column 12, line 1, in Claim 31, after "readable" insert -- storage --.

In column 12, line 5, in Claim 32, after "readable" insert -- storage --.

In column 12, line 8, in Claim 33, after "readable" insert -- storage --.

In column 12, line 13, in Claim 34, after "readable" insert -- storage --.

In column 12, line 18, in Claim 35, after "readable" insert -- storage --.

Signed and Sealed this

Twelfth Day of May, 2009

JOHN DOLL
*Acting Director of the United States Patent and Trademark Office*